United States Patent [19]

Zachariadis

[11] 4,405,999
[45] Sep. 20, 1983

[54] METHOD FOR COLLECTING AND GENERATING COMPOSITE TRACE SIGNALS WITH IMPROVED SIGNAL TO NOISE RATIOS

[75] Inventor: Robert G. Zachariadis, Dallas, Tex.

[73] Assignee: Mobil Oil Corporation, New York, N.Y.

[21] Appl. No.: 221,735

[22] Filed: Dec. 31, 1980

[51] Int. Cl.³ .................... G01V 1/36; G01V 1/38
[52] U.S. Cl. ........................... 367/23; 367/56; 367/61
[58] Field of Search ............. 367/15, 16, 123, 56, 367/59, 61, 14, 25, 177

[56] References Cited

U.S. PATENT DOCUMENTS

| | | | |
|---|---|---|---|
| 2,638,176 | 5/1953 | Doolittle | 181/0.5 |
| 2,798,211 | 7/1957 | Smith | 340/17 |
| 3,368,191 | 2/1968 | McDonal | 367/23 |
| 3,581,273 | 5/1971 | Hedberg | 340/7 PC |
| 3,605,674 | 9/1971 | Weese | 114/235 B |
| 3,644,882 | 2/1972 | Burg | 367/41 |
| 3,687,218 | 9/1972 | Ritter | 181/0.5 FS |
| 3,786,408 | 1/1974 | Jenkinson et al. | 367/59 |
| 3,790,929 | 2/1974 | Mayne et al. | 367/56 |
| 3,985,199 | 10/1976 | Baird | 181/107 |
| 4,033,278 | 7/1977 | Waters | 114/245 |
| 4,146,870 | 3/1979 | Ruehle | 340/7 R |
| 4,307,790 | 12/1981 | Khan et al. | 367/23 |
| 4,316,266 | 2/1982 | Barbier et al. | 367/23 |
| 4,316,267 | 2/1982 | Ostrander | 367/68 |
| 4,330,872 | 5/1982 | Bratton | 367/59 |

FOREIGN PATENT DOCUMENTS 2023829 1/1980 United Kingdom ............ 367/23
1569582 6/1980 United Kingdom ............ 367/57

OTHER PUBLICATIONS

M. B. Dobrin, Introduction to Geophysical Prospecting, 3rd Ed., 1976, pp. 107–111.

*Primary Examiner*—Nelson Moskowitz
*Attorney, Agent, or Firm*—A. J. McKillop; M. G. Gilman; J. F. Powers, Jr.

[57] ABSTRACT

Arrays of seismic wave sources and seismic wave sensors are towed over an area to be refraction surveyed in such a way that source and sensor geodetic positioning is duplicated during successive source firings. A plurality of traces having these same source/reflection point/sensor geometry are gathered from those produced by each series of successive source firings at the same location and stacked to generate a new trace having improved signal to noise ratio. Positioning is accomplished by uniformly spacing each of the sensors and sources in their respective arrays, the sources being spaced at integer multiples of the spacing of the sensors, and towing both arrays behind the same boat. If irregular or rapidly changing seismic statics are not present, all traces from common reflection points may also be gathered, corrected for normal moveout and stacked to generate a composite trace having enhanced primary reflection returns as well as improved signal to noise ratio.

9 Claims, 8 Drawing Figures

METHOD FOR COLLECTING AND GENERATING COMPOSITE TRACE SIGNALS WITH IMPROVED SIGNAL TO NOISE RATIOS

BACKGROUND OF THE INVENTION

This invention relates to marine seismic exploration and particularly to a method of obtaining seismic traces from common reflection points in submerged geophysical formations which may be stacked to improve the signal to noise ratio.

Marine seismic reflection surveying is a well-known method of geological investigation which is widely employed to locate undersea geological formations which may contain natural gas or petroleum. Marine seismic reflection surveying is typically accomplished by towing a seismic wave source comprising one or more seismic wave generators such as airguns and a multiplicity of hydrophones or other suitable transducers in a trailing linear array over an area to be surveyed. As the source is towed over the survey area it is periodically activated to produce a seismic wave in the water which travels outward and downward through the seafloor and underlying strata. Portions of the wave energy are reflected back into the water by the seafloor and at each of the underlying strata interfaces. The returning reflected waves pass by the hydrophones or other transducers in the trailing sensor array and cause a disturbance in their outputted reflection signals from which the time of passage of the reflected wave can be determined. The propagation time of a seismic wave to and from a reflection point is directly related to the depth of that point. The sensor outputted reflection signals are subsequently processed to generate a topological representation of the subsurface formations for analysis. The seismic source and trailing sensor array are towed continually through the survey area while gathering the reflection data. This allows marine reflection surveys to be made of large areas rather quickly.

Seismic reflection data is most typically gathered by common depth point shooting. This is accomplished with the marine reflection survey apparatus previously described by periodically firing the seismic source when it and the trailing sensor are approximately equidistant from an intermediate reflection point. A set of traces for each such reflection point is collected, each successive trace being generated while the seismic source is moving away from the particular reflection point. The seismic wave gathering each successive trace is reflected at an increasingly greater angle from the same reflection point. The set of traces gathered for a particular reflection point by common depth point shooting may be combined or "stacked" by subsequent data processing. In stacking, a normal moveout correction function is applied to the gathered traces to remove the phase differences arising from the slightly differing path lengths of the incident and reflected seismic waves producing each trace. An additional correction is required to remove the effect of surface and near surface irregularities. This correction, called the "static correction", may vary in an irregular manner from point to point both for the receiving array and for each shot. Stacking a series of traces generated by common depth point shooting and corrected for normal moveout and statics produces a composite trace representing an "ideal" vertical reflection of a seismic wave in which the ratios of the primary reflection return signal strength to noise and to secondary return signal strength are improved over any of the traces being stacked.

A significant problem arises when the common depth point shooting method described is used to gather data in certain marine areas having irregular geophysical statics such as in the Gulf of Mexico near the mouth of the Mississippi River where the seafloor is covered by networks of closely spaced, randomly located channels filled to varying depths with mud. Compared with other materials commonly found under the seafloor, this mud has a very slow seismic wave propagation velocity. Thus, as incident and reflected waves or both pass through the mud, their propagation time is greatly delayed. These propagation delays appear as irregular phase shifts among the traces collected by standard common depth point shooting in such areas. The primary reflections in such irregularly phase shifted traces will not be enhanced by stacking. Moreover as the mud attenuates the magnitude of the seismic wave, the collected traces generally have signal to noise ratios so low as to prevent their processing prior to stacking to remove or otherwise correct those traces having the irregularly occurring phase shifts. The traces collected in such areas by conventional methods are essentially uninterpretable.

A method used in both land and marine survey to improve the signal to noise ratio of data is to deploy an array of suitable transducers and generate several seismic waves in succession at the same location so as to produce a plurality of traces from seismic waves propagating along the same paths. The sensors are then relocated and the process repeated. Gathers of traces may then be combined or stacked bu subsequent data processing. Placing and recovering a spread of individual transducers from the seafloor is an extremely laborious and time consuming task. The process can be sped up somewhat by the use of a cable incorporating a multiplicity of transducers. The cable is positioned at a first location to record a series of seismic shots and then moved to a new location for a new series of shots. While using a cable in this fashion is considerably faster than handling a plurality of individual sensors, it still requires considerably more support ship time than conventional marine reflection survey using a continuously moving source and sensor array. Moreover, if a ground cable is used it is subject to damages while being dragged over obstacles on the seafloor and other hazards such as trawlers.

SUMMARY OF THE INVENTION

It is an object of this invention to provide a method for collecting marine seismic reflection traces which can be subsequently processed for increased signal to noise ratio.

It is another object of this invention to provide a method useful for collecting marine reflection traces in areas where the geophysical statics are irregular, rapidly changing or both.

It is still another object of this invention to accomplish the aforesaid object through an array of seismic wave sensors which is towed during the survey.

It is a further object of this invention to provide a method for accomplishing the aforesaid objects using commonly available marine seismic survey apparatus.

According to the invention, these and other beneficial results are achieved by towing an array of seismic sources and an array of seismic sensors over a survey area in such a manner that successive seismic sources occupy the same location with respect to the seafloor while subsets of sensors are also successively located in identical locations over the seafloor (geodetic positions) so that source and sensor geometry with respect to the seafloor is duplicated on several successive occasions. This is conveniently accomplished by towing both the sources and sensors behind a single boat or other suitable means in linear arrays, spacing the sources and sensors uniform distances from one another in their respective arrays, the uniform distance between the sources being an integer multiple of the uniform distance between the sensors, firing the sources in succession when each source is at approximately the same location over the seafloor and recording the traces generated by subsets of sensors also located in the same locations at the time of each sequential source firing. Traces generated by source snd sensors located in the same respective locations over the seafloor for each of a successive series of seismic shots have the same seismic wave propagation geometry with respect to the subsurface reflection points. Such traces may be subsequently stacked into a single composite trace having a signal to noise ratio greater than any of the individual traces being stacked.

DESCRIPTION OF A PREFERRED EMBODIMENT

Figure 1:
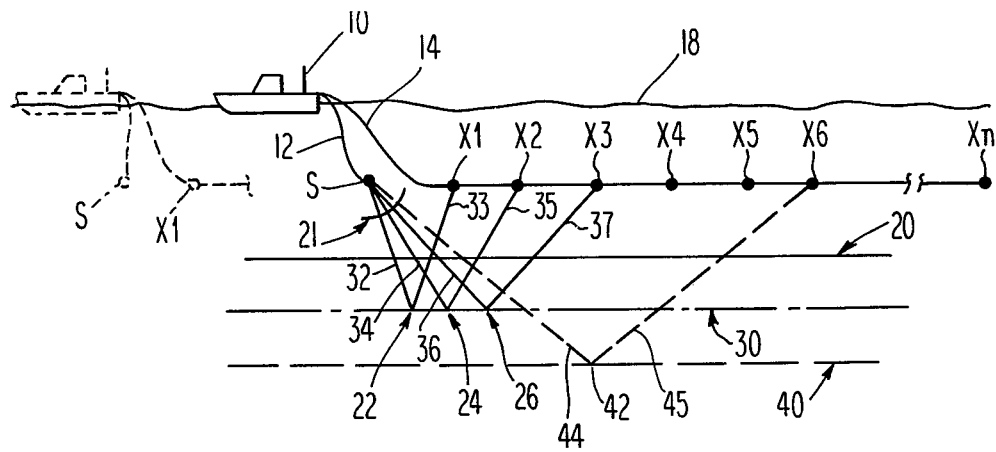
FIG. 1 is a cross-sectional view of a submerged geophysical formation showing a marine reflection survey apparatus configuration typically used to collect common depth point reflection seismic data.

An understanding of the invention is aided by a description of the common depth point survey technique commonly used for collecting seismic reflection data, the apparatus for which is depicted in FIG. 1. A survey ship 10 tows a first cable 12 upon which is mounted a seismic source S and a second cable 14 mounting a plurality of seismic sensors Xi. (The i denotes the particular sensor in the string.) The seismic source S may be a single device or a plurality of devices, such as airguns, which are fired simultaneously or in a carefully timed sequence so as to generate a single seismic wave. Such devices and the means used to control their simultaneous or sequential firings are well known and the latter are the subject of U.S. Pat. Nos. 3,687,218 to Ritter and 3,985,199 to Baird which are incorporated by reference herein. As they are used herein, the terms "seismic source" and "source" refer to the device or devices which are fired in any manner to produce a single primary seismic wave. The cable 14 is a commercially available seismic towing cable containing a multiplicity of hydrophones or other pressure transducers and suitable circuitry. Typically, the outputs of several hydrophones or transducers are connected in parallel or "grouped" to output a single signal which is transmitted by the circuitry in the cable 14 to the survey ship 10 for recording, retransmission, or display. As used herein, the terms "seismic sensor" and "sensor" Xi refer to the device or grouped devices which output a single trace record for recording or display. For common depth point shooting, the sensors Xi are typically identically configured and equally spaced from one another along the cable 14. The cables 12 and 14 are generally towed beneath the surface of the water behind the boat 10 in as straight a line as possible over the seafloor 20 and its underlying strata, comprising for purposes of illustration, layers A, B, C. Paravanes or other suitable devices (not depicted) are often used to keep each of the cables 12 and 14 at a uniform depth and in a straight line during towing operations. Control equipment (not depicted), typically in the boat 10, fires the seismic source S which generates a seismic wave having a front 21. The wave front 21 propagates away from the source S through the seafloor surface 20 and the underlying layers A, B, C. A portion of the wave energy is reflected at each strata interface such as at several reflection points 22, 24 and 26 on the interface 30 between the layers A and B. The wave energy reflected from the interface 30 propagates back up through layer A, through the seafloor surface 20 and through the water to the sensors Xi where it is detected. Solid lines 32 and 33, 34 and 35, 36 and 37 indicate the paths of the waves detected primarily by each of the sensors X1, X2 and X3, respectively. It should be realized that the effects of velocity changes from layer to layer which would deflect the theoretical ray between the source, reflection point and receivers, have been ignored for simplification. This simplification has also been made in the following FIGS. 2 and 4. Only a fraction of the seismic wave energy incident upon the interface 30 is reflected. The remainder continues through the interface 30 and underlying layer B to the interface 40 between the strata B and C. Again, a portion of the incident wave energy is reflected. For example, wave energy propagating along a path 44 is reflected at a point 42 on the interface 40 and along a path 45 up through the layers B and A, the seafloor surface 20 and the water, and is detected primarily by the sensor X6. The location of the survey ship 10, source S and first sensor X1 at the time of a second and subsequent firing of the source S is depicted in phantom.

Figure 2:
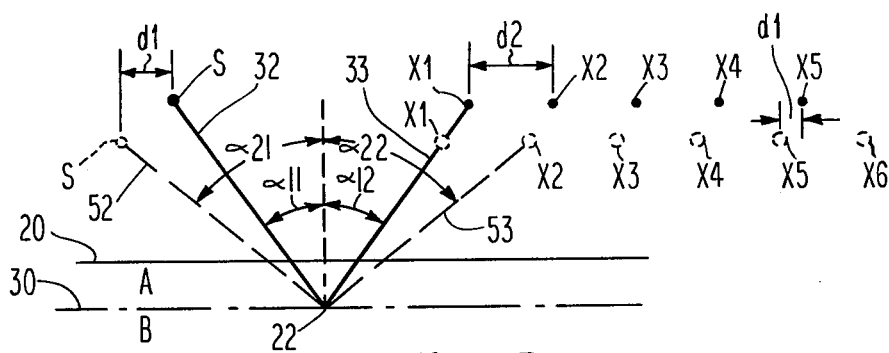
FIG. 2 is a diagrammatic cross-sectional view showing the propagation paths of seismic waves obtained by typical common depth point shooting for stacking.

Referring now to FIG. 2, there is depicted diagrammatically the spatial relationship of the seismic source S and sensors Xi during conventional common depth point shooting. A reflection point 22 on the interface 30, depicted in FIG. 1, is again considered for purposes of illustration. The positions of the source S and sensors Xi with respect to the point 22 at the time of the first firing of the seismic source S are depicted in solid. As in FIG. 1 the sensors Xi are identically configured and equally spaced on center a distance d2 from one another. The paths of the seismic wave incident upon and reflected from the point 22 are again indicated by the lines 32 and 33, respectively. For ease of explanation it is assumed the interface at the reflection point 22 is essentially level and horizontal. The source S and sensor X1 are then located at approximately equal distances from the vertical 52 extending above the reflection point 22. The seismic wave has an angle of incidence $\alpha_{11}$ and an angle of reflection $\alpha_{12}$ with respect to the vertical 52. The passage of the reflected wave is detected primarily by the sensor X1 and causes a perturbation or reflection return in its output signal. The reflection return may be caused by a primary reflection of the seismic wave as are the reflection returns generated by the seismic waves propagating along paths 34 and 35; 36 and 37; and 44 and 45 of FIG. 1 and 32 and 33 of FIGS. 1 and 2, or by secondary events such as multiple reflections or refractions of the seismic wave (not depicted).

The relative position of the seismic source S and sensors Xi at the time of a second and later firing of the seismic source S are depicted in phantom. In the time between the first and second firing, the source S and the array of sensors Xi have been towed a distance d1 which is equal to one-half d2 to the left of their original position. At the time of the second firing, the source S and sensor X2 are located at approximately equal distances from the vertical 52. A portion of the seismic wave generated from the second firing of the source S propagates along the path 52 at an angle $\alpha_{21}$ with respect to the vertical 52 and is reflected from the same reflection point 22 along a path 53 at an angle $\alpha_{22}$ with respect to the vertical S2 into the water where it is now detected primarily by sensor X2. The source S and sensors Xi continue to be towed to the left and when the source S has again traveled a distance which is an integer multiple of one-half d2, it is again fired and the subsequently reflected wave is detected primarily by a sensor X3 located on the opposite side of the vertical 52 at a distance approximately equal to that between the source S and vertical 52. This process is repeated until a sufficient number of traces are collected for the reflection point 22. The trace generated by the sensor X1 after the first firing of the source S, by the sensor X2 after the second firing of the source S and traces generated by other trailing sensors Xi from the reflection of subsequent shots of the source S by the reflection point 22 may be gathered subsequently for stacking by conventional techniques. Stacking is a well known procedure for combining or mixing traces generated by common depth point shooting so as to produce a composite trace in which signal to noise ratios of the primary reflection returns are enhanced. In stacking, the timing or phase differences between the traces arising from the different propagation paths of the seismic wave due to the combined effect of differing incidence angles ($\alpha_{11}$, $\alpha_{21}$) and reflection angles ($\alpha_{12}$, $\alpha_{22}$) and the differing velocities of propagation in the geophysical layers, are removed. The composite trace produced depicts the theoretical timed sequence of reflections generated by a wave propagating to and from the reflection point 22 along the vertical 52. The selection of a particular processing scheme to stack traces is a matter of choice.

Figure 3:
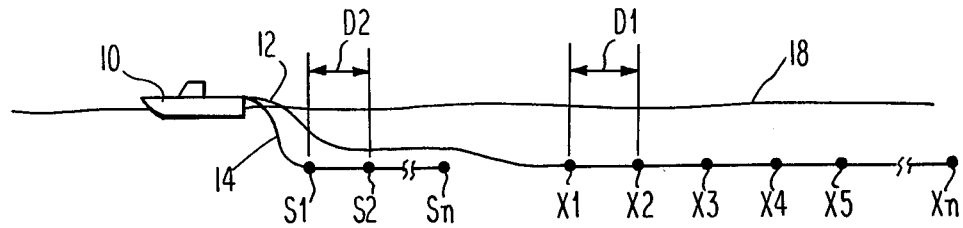
FIG. 3 is a cross-sectional view of a submerged geophysical formation showing a marine reflection survey apparatus configuration used in practicing the invention to obtain reflection seismic data.

FIG. 3 depicts diagrammatically a configuration of seismic sources S1-Sn and sensors X1-Xn for practicing the invention. The configuration in FIG. 3 differs from that in FIG. 1 by the inclusion of an array of seismic sources S1-Sn in FIG. 3. The array is towed by suitable means such as a cable 12 behind a survey ship 10 beneath the surface of the water over a section of seafloor 20 to be reflection surveyed. The array of seismic sources S1-Sn consists of several individual seismic wave generators, again such as airguns, which can be activated individually, simultaneously or sequentially so as to generate identical shock waves from different locations in the array. It shall hereinafter be understood that the location of a particular seismic source Si in the array S1-Sn is the apparent origin of the seismic wave produced by that seismic source. (Seismic sources and sensors in the arrays S1-Sn and X1-Xn shall be referred to generally as Si and Xi, respectively.) It is envisioned that 3 or 4 seismic sources will be sufficient to practice the invention. This would require at least 3 or 4 individual seismic wave generators. The cable 14 is again a conventional, commercially available seismic towing cable incorporating a plurality of hydrophones or other pressure transducers with suitable circuitry. Each sensor Xi consists preferably of a subset or group of hydrophones or transducers wired together so as to output a single reflection signal. The combining of several transducers so as to output a single trace signal is well known and is the subject of, for example, U.S. Pat. No. 2,798,211 to Smith which is hereby incorporated by reference. As is pointed out in the Smith patent, such outputs may be hard wired together or variably mixed by suitable means before recording. Although the selection of transducer outputs to be combined and the location of those transducers in a cable is a matter of preference, for the practice of this invention it is suggested that identical numbers of similarly located transducers be combined or grouped to form identical sensors Xi so that each such sensor will produce an identical response when placed in the same position and orientation with respect to identically reflected seismic waves. Again, the term "sensor" as used herein shall be understood to refer to any device, whether individual transducer or wired group of transducers which outputs a single trace signal for recording. The cables 12 and 14 may also be equipped with paravanes (not depicted) for uniform depth towing. If necessary, cables 12 and 14 may also be equipped with devices for controlling their lateral position (not depicted), such as are described in U.S. Pat. Nos. 4,033,273 to Waters and 3,605,674 to Weese, hereby incorporated by reference, to tow them in essentially straight lines behind the towing vessel.

To practice the invention, it is suggested that the centers of each sensor Xi be equally spaced a distance D1 from one another along the cable 14. The center of a sensor formed by a group of connected hydrophones or other pressure transducers is the mid-point between the opposing extremely located devices comprising the sensor. It is further suggested that the centers of adjoining seismic sources Si be likewise equally spaced from one another a distance D2. Where the invention is practiced by towing the seismic sources Si and sensors Xi behind the same boat as in the example being discussed, it is preferred that the distance D2 be an integer multiple of the distance D1. The total length of the array of sources S1-Sn is also much less than the total length of the array of sensors X1-Xn. These conditions will assure that when the sources Si are fired sequentially from a first geodetic position there will be subsets of sensors Xi occupying a set of other geodetic locations so that source/sensor geodetic positioning is repeated for successive shots.

Reference is now made to FIGS. 4A-4E which depict the spatial relationships for a sample array of four seismic sources S1-S4 and a multiplicity of sensors X1-Xn (only the first few of which are depicted) in an illustrative sequence of five seismic source firings. Also for purposes of illustration, the distance D1 between the adjoining sensors Xi and the distance D2 between the adjoining seismic sources Si are equal.

Figure 4A:
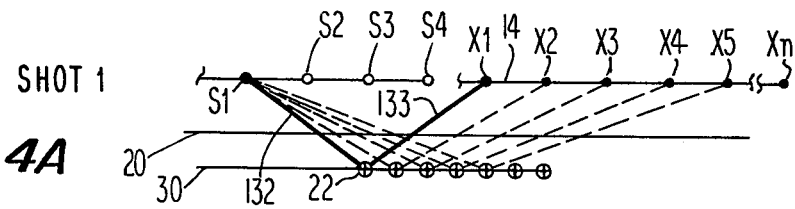
FIGS. 4A-4E are diagrammatic cross-sectional views showing the practice of the invention in steps to collect a plurality of seismic reflection traces for a typical reflection point.

In FIG. 4A the positions of the sources S1-S4 and the first five sensors X1-X5 of the trailing array of sensors Si are depicted at the time the seismic source S1 is fired. The firing of the source S1 produces a seismic wave a portion of which radiates along a path 132 through the water, through the seafloor surface 20, and various underlying strata to a reflection point 22 on an interface 30 between two strata where a portion of the wave energy is reflected upward along a path 133, again through the overlying strata, seafloor surface and water, past the sensors Xi where it is detected primarily by the sensor X1. Paths of portions of the seismic wave generated by the source Si and detected by the sensors X2 through X5 from various other reflection points+are depicted in phantom. When the reflected wave is of sufficient magnitude its passage by a sensor will cause a perturbation in that sensor's signal. The sensor signals are conducted through suitable circuitry in the cable 14 to appropriate equipment in the towing boat where typically they may be displayed, recorded or retransmitted to another location for processing.

Figure 4B:
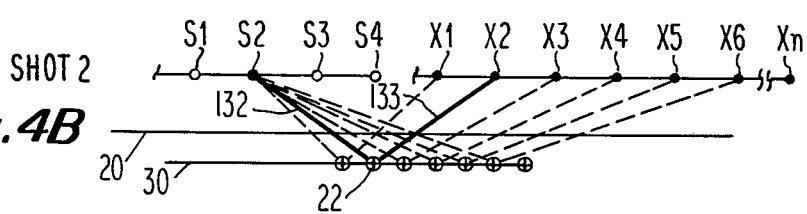

In practicing the invention, it is envisioned that the arrays of seismic sources Si and sensors Xi be towed in a straight line so as to assure that the sources Si and sensors Xi will pass through the same geodetic locations. At some later time dependent upon the distance D2 selected and the speed at which the arrays of sources Si and sensors Xi are being towed, the seismic source S2 will occupy the same geodetic position that had been occupied by the seismic source S1 at the time of its firing (depicted in FIG. 4A) at which time the seismic source S2 is fired. The spatial relationships of the various seismic sources S1–S4, reflection point 22 and sensors X1–X6 at the time of the firing of the seismic source S2 are depicted in FIG. 4B. A portion of the seismic wave generated by the firing of source S2 travels along the same path 132 to the reflection point 22 and is reflected along the same path 133 to the sensors Xi and is detected primarily by the sensor X2. Because the seismic wave produced by the firing of the seismic source S2 and detected by the sensor X2 will have traveled along the same incidence and reflection paths 132 and 133 it is expected that it will have experienced the same propagation delays experienced by the wave produced by the firing of source S1 and detected by sensor X1 in FIG. 4A.

Figure 4C:
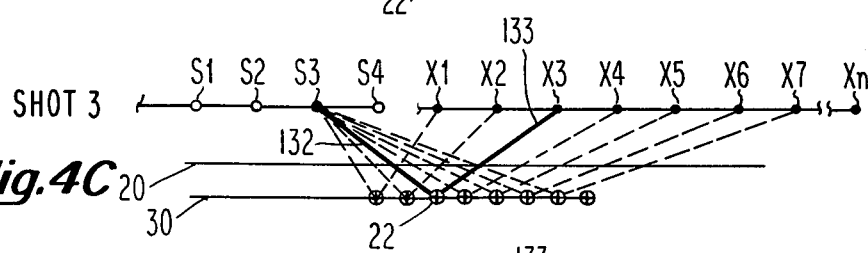

FIG. 4C depicts the locations of the seismic source and sensor arrays which have continued to be towed past the reflection point 22. When the seismic source S3 is in the geodetic position occupied by the seismic sources S2 and S1 at the time of their firings it too is fired. Source S3 is now in the same spatial orientation with respect to the reflection point 22 as were the seismic sources S2 and S1 at their firing. A portion of the seismic wave energy generated by the firing of S3 will propagate essentially along the same path 132 to the reflection point 22 where it will be reflected and travel back up to the sensors Xi essentially along the same propagation path 133. The reflected wave is detected primarily by sensor X3, which is in the same geodetic position and hence same spatial orientation with respect to the reflection point 22 as were sensors X2 and X1 at the previous firings of the seismic sources S2 and S1, respectively.

Figure 4D:
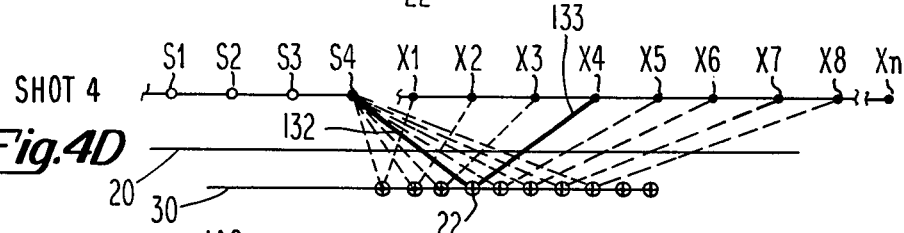

FIG. 4D depicts the generation of yet another trace by the sensor X4 after the firing of source S4. Again S4 is fired when it occupies the same location occupied by sources S1-S3 at the time of their firings. Sensor X4 occupies the same position occupied by sensors X1–X3 during the firings of sources S1-S3, respectively, and detects the wave reflected from point 22.

Figure 4E:
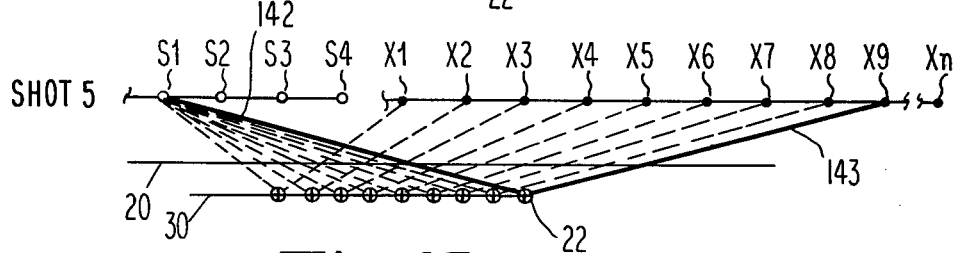

FIG. 4E depicts a fifth shot which is the second firing of seismic source S1. Because of the lateral displacement of the source S1 from the reflection point 22 caused by the towing of the seismic source and sensor arrays, the wave energy from the second firing of the source S1 travels a more oblique path 142 to the reflection point 22 and is similarly reflected along a more oblique path 143 to the trailing sensor array Xi where it is detected primarily by sensor X9. In a similar fashion, seismic sources S2 through S4 are again consecutively fired and a subset of traces from seismic waves traveling along paths 142 and 143 generated from other trailing sensors Xi (not depicted). The boat continues towing the arrays of sources Si and sensors Xi across the area to be surveyed and the process is repeated.

The traces gathered from sensor groups X1, X2, X3 and X4 from shots 1, 2, 3, and 4, respectively, are stacked by conventional seismic trace data processing techniques to create a single composite trace. Because each of the individual traces being stacked was generated at a different time, the random noise associated with each will, according to theory, average out, while the reflection returns will occur at the same point in each trace and be reinforced. The subset of traces gathered from the second set of firings of sources S1–S4 representing wave energy traveling to and from the reflection point 22 along paths 142 and 143, respectively, are also similarly stacked into a single composite trace. If gathered in an area having irregular or rapidly changing statics or both, the return enhanced composite traces can then be examined and those with irregular phase shifts corrected or discarded. After such correction, the composite traces such as those for paths 132 and 133 and paths 142 and 143 as well as any other traces of waves reflected at different angles and hence along different propagation paths from the reflection point 22, may also be stacked together by conventional methods, as would be traces generated by the conventional common depth point shooting techniques previously described, to produce still another composite trace in which the primary reflection returns are enhanced and while secondary returns such as multiple reflections and refractions averaged away. If preliminary processing to remove irregular phase shifts is not required, stacking all common reflection point traces can be done in a single operation.

In the examples of the practice of the invention depicted in FIGS. 4A–4E the seismic sources Si are depicted as being fired in sequence. It is envisioned that other sequences of seismic firings and mixed sequences of seismic source firings may be used in practicing the invention. Similarly, although the invention has been described being practiced by towing both sources and seismic sensors behind a single boat, it is envisioned that separate devices may be used to tow seismic sources and seismic sensors at different speeds over an area to be seismic surveyed. Also, although the method has been described as being useful in certain river delta areas it should be appreciated that it is of general applicability and can be employed in any marine geophysical region where seismic wave propagation characteristics vary rapidly and/or irregularly to a significant degree or where the signal to noise ratio of the traces gathered by conventional reflection survey by towed seismic source and sensor array is unacceptably low.

It will be apparent that the various elements empoloyed in combination in the practice of the present invention are capable of many variations and changes in the application thereof. It should therefore be understood that the particular embodiments of the invention shown in the drawings and described above are intended to be illustrative only and are not intended to limit the scope of the invention.

What is claimed is:

1. A method of improving the signal to noise ratio of collected reflection seismic traces gathered over a water covered seafloor area having irregular geophysical statics generating irregular phase shifts in the seismic traces gathered comprising the steps of:

towing a plurality of seismic sources in a first linear array and a plurality of seismic sensors in a second linear array over the seafloor area to be surveyed;

firing during said towing step one of said seismic sources at a first source location with respect to the seafloor to generate a first seismic wave;

detecting returns of said first seismic wave with a first seismic sensor located at a first sensor location with respect to the seafloor;

generating as a result of said detecting step a first seismic trace signal representing returns of said first seismic wave traveling to said one sensor;

firing at a later time during said towing step another of said seismic sources located at said first source location with respect to the seafloor to generate a second seismic wave;

detecting returns of said second seismic wave with a second sensor located at said first sensor location with respect to the seafloor;

generating as a result of said second detecting step a second seismic trace signal representing returns of said second seismic wave traveling to the second sensor;

repeating the firing, detecting, and generating twice with different seismic sources, each located at a second source location with respect to the seafloor during each firing step and different seismic sensors each located at a second sensor location with respect to the seafloor during each detecting step to generate a third trace and a fourth trace having the same seismic wave propagation path between the second source location and the second sensor location, the second source location and the second sensor location each being equidistant from a midpoint location between the first seismic source location and the first seismic sensor locations whereby the four traces have the same reflection points;

stacking said first and second trace signals to produce a first composite trace having a signal to noise ratio higher than the signal to noise ratio of said first and second seismic trace signals and said third and fourth trace signals to produce a second composite trace having a signal to noise ratio higher than the signal to noise ratio of said third and fourth trace signals;

correcting said first composite trace and said second composite trace for irregular phase shifts caused by irregular geological statics between the path followed by the seismic waves generating the first composite trace and the path followed by the seismic waves generating the second composite trace; and stacking together the pair of corrected composite trace signals to generate a second level composite trace signal.

2. The method of claim 1 further comprising the steps of:

generating during said towing step a multiplicity of seismic trace signals;

combining the seismic trace signals of each of a plurality of subsets of said multiplicity of seismic trace signals, the seismic trace signals of each subset being generated by seismic waves traveling from the same source location with respect to the seafloor to the same sensor location with respect to the seafloor, to produce an equal plurality of composite seismic trace signals, each composite trace signal representing propagation of seismic waves from a particular reflection point location and having a signal to noise ratio at least as high as the highest signal to noise ratio of the seismic trace signals combined to produce said composite signal;

selecting a plurality of the composite signals representing a seismic wave propagating from the same reflection point location;

correcting the plurality of selected composite signals for irregular phase shifts caused by irregular geoplogical statics along paths followed by the seismic waves generating the different selected composite trace signals; and combining the corrected composite signals, to produce a second level composite trace signal.

3. The method described in claim 1 wherein said step of towing further comprises towing said first and second arrays at the same velocity and in the same direction and said method further comprises the steps of:

spacing each of said seismic sensors a first uniform distance apart from one another during said towing step; and spacing said seismic sources a second uniform distance apart from one another during said towing step, said second uniform distance being an integer multiple of said first uniform distance.

4. The method of claim 1 wherein said first detecting step further comprises:

detecting returns of said first seismic wave with a first subset of sensors, each sensor of the first subset being located at one of a first subset of sensor locations with respect to the seafloor;

wherein said first generating step further comprises:

generating a first subset of seismic trace signals, each signal representing returns of said first seismic wave traveling to one of the sensors of said first subset of sensors;

wherein said second detecting step further comprises:

detecting returns of said second seismic wave with a second subset of sensors, each sensor of the second subset being located at one of the first subset of sensor locations with respect to the seafloor;

wherein said second generating step further comprises:

generating a second subset of seismic trace signals, each signal representing returns of said second seismic wave traveling to one of the sensors of the second subset of sensors;

wherein the method further comprises before said stacking step the step of:

selecting a plurality of pairs of seismic trace signals, one signal of each pair from the first subset of trace signals and one signal of each pair from the second subset of trace signals, the pair of selected trace signals representing returns of seismic waves traveling from the same first source location with respect to the seafloor to the same sensor location with respect to the seafloor; and said stacking step further comprises:

stacking together the selected trace signals of each of said plurality of pairs of seismic trace signals to generate an equal first plurality of composite trace signals.

5. The method of claim 4 wherein the two subsets of sensors are overlapping.

6. The method described in claim 1 wherein said plurality of seismic sources is composed of a plurality of seismic wave generators in said step of firing a first of said seismic sources comprises firing said plurality of seismic wave generators in a first sequence with delays between the generator firings to produce said first seismic wave at said first location and said step of firing a second of said seismic sources comprises firing said plurality of seismic generators in a second different sequence with delays between the generator firing to produce said second seismic wave at said first seismic source location.

7. The method described in claim 6 further comprising repeating the steps of firing said plurality of seismic wave generators in different sequences with delays between the firings to produce a plurality of successive seismic waves at each of a plurality of successive locations.

8. A method of improving the signal to noise ratio of collected reflection seismic traces gathered over a water covered seafloor area having irregular geological statics generating irregular phase shifts among the traces gathered comprising the steps of:

towing a plurality of seismic sources in a first linear array and a plurality of seismic sensors in a second linear array over the seafloor area;

firing said sources during said towing step at a plurality of source locations with respect to the seafloor to generate seismic waves;

detecting reflections of said seismic waves with said sensors to produce seismic traces representing reflections from subsurface reflection points;

gathering seismic traces having the same seismic wave propagation geometry with respect to said subsurface reflection points;

stacking the gathered seismic traces to produce composite traces having enhanced signal to noise ratio for reflections of seismic waves with the same propagation geometry;

selecting composite traces representing reflections from the same subsurface reflection points and having different wave propagation geometries;

correcting the selected composite traces for irregular phase shifts caused by the irregular geological statics among the seismic wave propagation paths for the different propagation geometries; and restacking the corrected composite traces representing reflections from the same subsurface reflection points to produce a second level composite trace having further enhanced signal to noise ratio.

9. The method described in claim 1 wherein said step of firing a first seismic source further comprises firing a first plurality of seismic wave generators and said step of firing a second seismic source comprises firing a second plurality of seismic generators at least one generator of which was not fired in said first seismic source firing.

* * * * *